United States Patent [19]

Chen

[11] Patent Number: 5,259,302
[45] Date of Patent: Nov. 9, 1993

[54] AUTOMATIC DEEP FRY APPARATUS

[76] Inventor: Cheng-Tsun Chen, 1499 - 17th Ave. Northwest, New Brighton, Minn. 55112

[21] Appl. No.: 796,418

[22] Filed: Nov. 22, 1991

[51] Int. Cl.$^5$ .............................................. A47J 37/12
[52] U.S. Cl. ........................................ 99/405; 99/330; 99/404; 99/407; 99/443 C; 134/132; 198/724; 198/778
[58] Field of Search ................. 99/365, 362, 373, 386, 99/403–406, 407, 409, 410, 443 C, 477–479; 426/523; 134/132, 64; 198/724, 778; 68/158

[56] References Cited

U.S. PATENT DOCUMENTS

| | | | |
|---|---|---|---|
| 1,414,713 | 5/1922 | Sherman et al. | 99/405 |
| 1,644,516 | 10/1927 | Ehrhart | 99/406 |
| 2,464,216 | 3/1949 | Devol | 134/132 |
| 2,833,204 | 5/1958 | Kipnis | 99/405 |
| 3,234,869 | 2/1966 | Porambo | 99/405 |
| 3,329,081 | 7/1967 | Roth | 99/405 |
| 3,391,634 | 7/1968 | Williams et al. | 99/405 |
| 3,811,148 | 5/1974 | Martin | 134/132 X |
| 4,357,862 | 11/1982 | Anstett et al. | 99/355 |
| 4,694,742 | 9/1987 | Dover . | |
| 4,706,557 | 11/1987 | Feng et al. | 99/355 |
| 5,133,249 | 7/1992 | Zittel | 99/404 |

FOREIGN PATENT DOCUMENTS 557803  5/1958  Canada ................................ 99/406

OTHER PUBLICATIONS

Dialog computer search dated Jul. 6, 1991 (17 pages).

*Primary Examiner*—Timothy F. Simone
*Attorney, Agent, or Firm*—Palmatier, Sjoquist & Helget

[57] ABSTRACT

A deep fry apparatus for automatically and sequentially deep frying food articles below the surface of a hot fluid and at different depths or multi-levels in the fluid. An automatic feeder mechanism for feeding food articles to the deep fry apparatus is also disclosed. One embodiment of the deep fry apparatus initially conveys food articles to a bottom step of the deep fryer via a stream of cooking oil flowing through a tube. This embodiment of the deep fry apparatus includes a spiral, stepped grid which conveys the food articles back to the surface of the fluid step by step via a forward/backward stroke mechanism which includes a quick release mechanism for releasing the food articles relative to a step of the grid by the principle of inertia. The food articles are automatically pushed out of the surface and out of the apparatus via the forward/backward stroke mechanism. Other embodiments also include multilevel staggered grids with conveyers for transporting the food articles from grid portion to grid portion and out of the deep fry apparatus. Another embodiment utilizes the deep fry apparatus in a vending machine.

45 Claims, 7 Drawing Sheets

AUTOMATIC DEEP FRY APPARATUS

The present invention relates to treating articles below the surface of a fluid and for transporting the articles back to the surface of the fluid by increments.

BACKGROUND OF THE INVENTION

Sweet and sour pork and sweet and sour chicken are Chinese dishes of pork and chicken dipped in batter and fried in oil. The process of preparing these Chinese dishes utilizes two vessels. One vessel is typically a bowl containing a batter mixture of water, a grain flour, and food pieces such as pieces of meat or vegetables. The second vessel is typically a wok containing hot oil.

The batter-dipped food pieces or articles are dropped into a wok, and initially sink until the batter about the food pieces expands whereupon the food articles become floatable and rise to the surface of the oil. The food particles then are fried on the surface of the oil for several minutes or until they turn a certain shade of brown.

The conventional deep fry process has a number of problems. First, the process is slow, troublesome and very inefficient. This is caused for the most part by the manual labor involved. The pieces of food are hand-dipped into the batter, transferred by hand to the wok one by one, turned over manually in the wok, monitored visually in the wok, and removed from the wok by hand.

A second problem is that the conventional dipping and deep frying process is very messy. The liquid-like batter drips as the food pieces are being transferred manually from the batter to the wok. The batter drips onto surfaces between the batter bowl and the wok, and into the wok itself. Batter dripping into the wok not only creates a mess, but lowers the temperature of the oil, and absorbs and thus wastes oil. These drips occupy space on the surface of the oil that otherwise may be used for food pieces. Furthermore, the drips when cooked mingle with the food pieces and must ultimately be separated from the food pieces to create an appetizing and appealing dish.

A third problem is that the manual deep fry process may produce food pieces which stick together and which hence are more difficult to eat. The food pieces become joined to each other as a result of contact between the pieces within several seconds after being dropped into the oil. During this time, a shell is formed about the batter-dipped food piece, and this shell forms about and joins any pieces which are sticking together by virtue of the sticky batter. This problem is compounded by the conventional method of dropping the pieces into the hot oil. After the pieces have dropped into the oil, the pieces initially sink under the inertia of the fall, but then expand under the influence of the heat of the oil and consequently rise to float on the surface of the oil. As the pieces rise to the surface, they may come into contact with other pieces from below, which then may permit a common shell to be formed about the two pieces.

A fourth problem is that the food pieces may be undercooked or overcooked. This may be caused by the difficulty in judging how much time each individual food piece has been frying in the oil as the food pieces are typically dropped one by one into the wok over a period of time but removed at the same time. This problem may also be caused by one-half of the food piece being submerged and the upper half remaining above the oil. This may also be caused by uneven oil temperatures in the wok.

A fifth problem relates to safety. The conventional Chinese deep fry process causes an oil mess and particularly produces a great quantity of bits of batter. This environment lends itself to accidents, such as combustion of the drips of batter. Moreover, pouring large quantities of oil into and pouring large quantities of hot oil from the conventional commercial wok is dangerous.

A sixth problem is hygiene. Food is hand-dipped into the batter, transferred by hand to the wok, and manually removed from the wok. Furthermore, the heat from the oil and vapor creates a hot working environment in which the attendant cook may sweat profusely.

A seventh problem is that, even with relatively large woks, the area for deep frying is small. Only the surface of the oil is used for frying.

An eighth problem is the conventional Chinese deep frying process occupies a relatively great amount of kitchen space and takes a relatively great amount of time. Hence, Chinese dishes may not be prepared during the busy hours, but are typically cooked in advance, which then undesirably requires the dishes to be cooked a second time for the customer A ninth problem is the conventional Chinese deep fry process requires a skilled cook, who may be difficult to find. Furthermore, this job is undesirable for most people.

A tenth problem is the cost of labor. Even skilled cooks must work long hours. Moreover, the cost of batter loss and oil loss contributes to the waste. Oil loss may be caused by high temperature deterioration.

SUMMARY OF THE INVENTION

A feature of the present invention is the provision in a deep fry apparatus for deep frying food articles below the surface of a fluid in a container, of submerging means for submerging the articles below the surface and engagement means in the container for engaging the articles submerged in the fluid and for transporting the articles back to the surface.

Another feature is the provision in such an apparatus, of the articles being of a lesser density than the fluid.

Another feature is the provision in such an apparatus, of the engagement means including a set of steps to transport the submerged articles step by step back to the surface of the fluid.

Another feature is the provision in such an apparatus, of the engagement means engaging the articles from above the articles.

Another feature is the provision in such an apparatus, of quick release means for rapidly and periodically disengaging the articles from the engagement means such that the articles are transported by increments back to the surface of the fluid.

Another feature is the provision in such an apparatus, of conveyers for transporting the articles back to the surface of the fluid.

Another feature is the provision in such an apparatus, of the engagement means being formed in the shape of a spiral.

Another feature is the provision in such an apparatus, of the submerging means being a tube with a stream of fluid directed therethrough and the outlet of the tube being disposed under the surface of the fluid.

An advantage is that the present invention is economical and efficient. The batter-dipping and deep frying operations are automated.

Another advantage is that the present process is clean. The automation eliminates human contact with either the dipping or frying portions of the process.

Another advantage is that the deep fry time is controlled. Hence, food pieces may be uniformly deep fried.

Another advantage is that the food pieces need not be turned over manually during the deep fry process as the food pieces remain totally submerged in the hot oil throughout the deep fry process. Accordingly, the food pieces are cooked evenly.

Another advantage is safety. One of the features contributing to this advantage is the smooth stream of hot oil which conveys the batter-dipped food piece to the bottom of the deep fry vessel to minimize the impact of the food piece onto the surface of the hot oil and thus minimize a splattering of oil as the food piece hits the surface of the hot oil.

Another advantage is that the present invention is simple and inexpensive to manufacture, install, operate and maintain. One of the features contributing to this advantage is the lightweight grid and belt and pulley mechanisms, each of which may be driven by a light duty motor. Moreover, with such a light duty motor, vibrations are minimized.

Another advantage is that the inadvertent joining of two batter-dipped food pieces is minimized. One feature contributing to this advantage is the smooth downwardly flowing stream which conveys a food piece away from the location on the surface of the oil where a trailing food piece will be dropped.

Another advantage is that food orders or articles of manufacture may be cooked or treated sequentially with less of a chance that food orders will be mixed up.

Another advantage is that a greater amount of food articles may be fried for a given amount of fluid. With the present invention, food articles are fried on many levels. With the prior art method of surface frying, only one level, the surface, is utilized.

Another advantage is that the present invention accommodates both small and large food articles.

DETAILED DESCRIPTION OF THE PREFERRED EMBODIMENT

Figure 1:
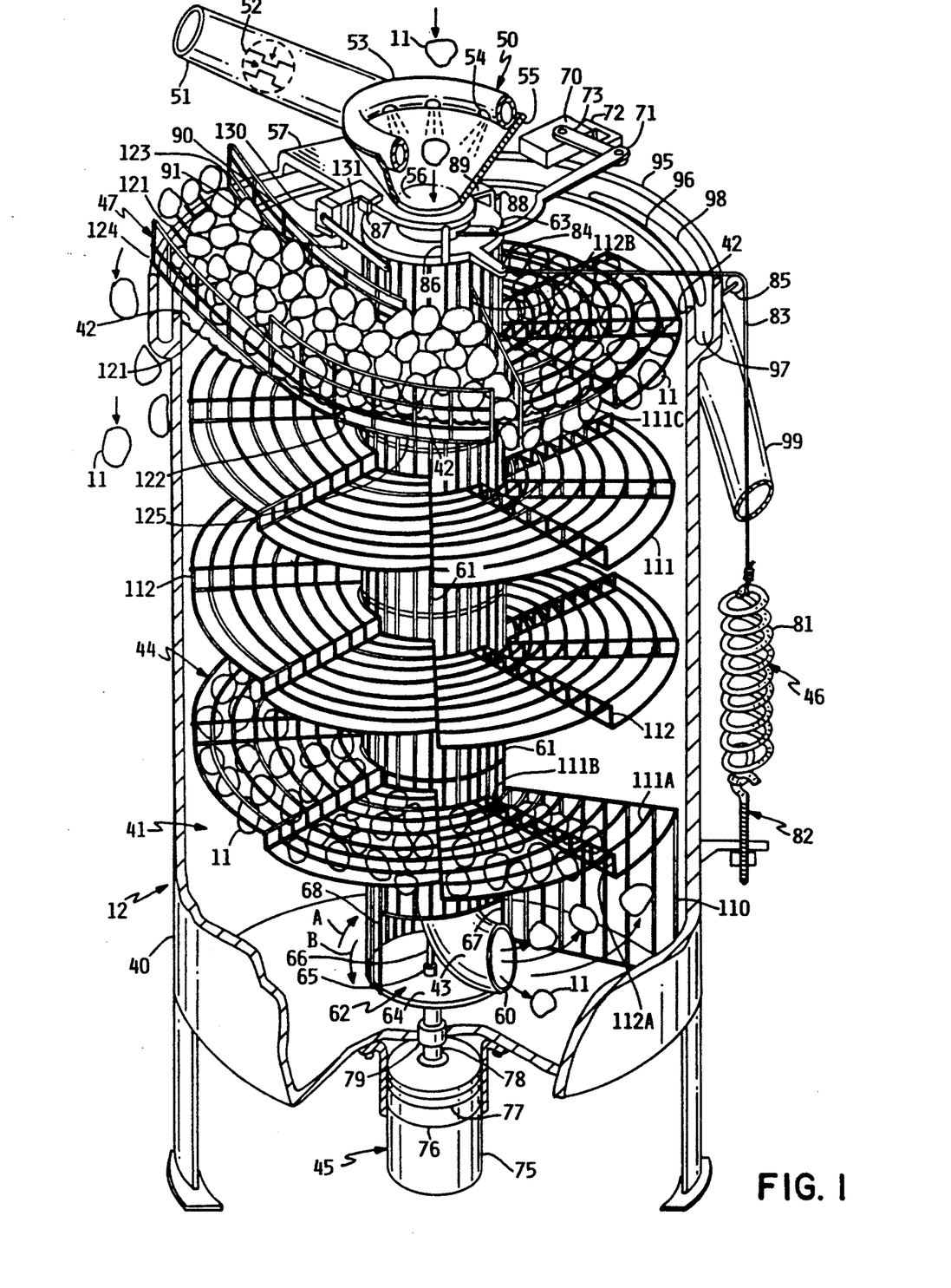
FIG. 1 is a perspective, partially broken away, and partially schematic view of the present deep fry apparatus for deep frying food articles below the surface of a fluid.
Figures 2, 10, 10A:
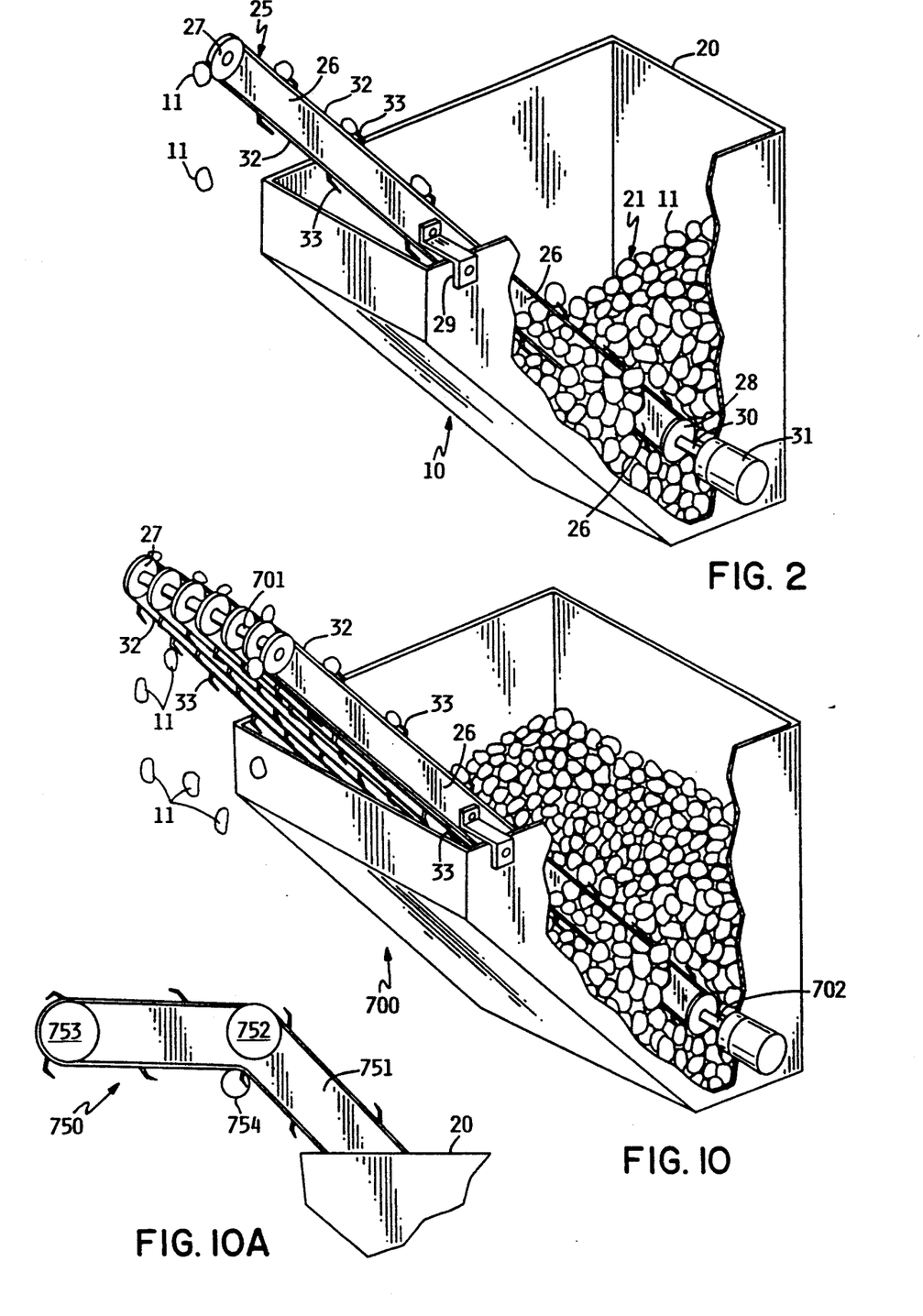
FIG. 2 is a perspective, partially broken away, and partially schematic view of the feed mechanism for the present process apparatus of FIG. 1.
FIG. 10 is a perspective, partially broken away, and partially schematic view of an alternate feed mechanism utilized for the process apparatus of FIGS. 4, 6, 7, and 9.
FIG. 10A is a schematic view of an alternate feed mechanism utilized especially for the process apparatus of FIGS. 4, 6, 7, and 9.

As shown in FIGS. 1 and 2, a first embodiment of the present deep fryer invention includes a feed mechanism 10 for feeding food articles 11 to a spiral deep fryer mechanism or processing apparatus 12.

As shown in FIG. 2, the feed mechanism 10 includes a receptacle 20 for receiving a mixture 21 of the food articles 11 and a semi-liquid batter for coating the food articles 11. The food articles may include pieces of meat such as chicken or pork, pieces of fish or shrimp or vegetables, or meatballs.

A belt and pulley mechanism 25 is affixed to the receptacle 20 for engaging and picking up the food articles 11 from the receptacle 20 and for dropping the food articles 11 into the spiral deep fryer 12. The belt and pulley mechanism 25 includes an elongate support plate 26 for supporting a pair of respective passive and drive pulleys 27, 28 in a spaced apart relation. The support plate 26 is affixed to the receptacle 20 via a bracket 29. Drive pulley 28 is driven by a drive shaft 30, which in turn is driven by a drive means 31. An endless narrow belt 32 engages the pulleys 27, 28 about the support plate 26 and includes bent pins 33 for engaging the food articles 11. The pins 33 may engage and then pick up the food articles 11 on a downward approach to or an upward departure from the drive pulley 28. As the pin-engaged food articles 11 pass about the bight of pulley 27, the force of gravity draws the food articles 11 off the pin 33 immediately before or when the distal portion of the pin 33 is oriented generally downwardly. It should be noted that the belt 32 may be a thin metal strip with the pins 33 being integral with and stamped from the belt 32. The belt 32 and support plate 26 are narrow to permit wet batter to drip therefrom.

As shown in FIG. 1, the spiral deep fryer mechanism or processing apparatus 12 includes as its principal components a container 40 containing hot fluid 41 such as hot water or cooking oil with a surface 42, a generally vertical submerging tube 43 for feeding in or submerging the food articles 11, a spiral engagement means or grid 44 for retaining the food articles 11 under the surface 42 and for transporting the food articles by increments back to the surface of the fluid 41, drive means 45 and a quick release mechanism 46 for the step of conveying or pushing or transporting and the step of permitting the food articles 11 to floatably rise, and an output grid 47 for directing the food articles 11 out of the container 40.

With more particularity, the submerging means 50, having the submerging tube 43, includes a fluid inlet hose 51, which may include a variable pumping or resistance mechanism 52 for varying the velocity of the fluid flowing through the hose 51 and tube 43. The velocity of the fluid flowing through the tube 43 may vary at a cyclical rate to dispense and distribute the food articles 11 exiting from the tube 43 uniformly underneath the spiral grid 44 as the tube 43 rotates relative to the grid 44.

The fluid inlet hose 51 engages a ring tube 53 with ports 54 for dispensing fluid into a funnel 55. The funnel 55 directs the fluid to an inlet 56 of the tube 43. The funnel 55, ring tube 53, and fluid inlet hose 51 are fixed to the container 40 via a support arm 57. The inlet 56 is higher than the surface 42, and it should be noted that the inlet 56 may be adjusted even higher if desired by a telescoping arrangement.

The tube 43 extends from its inlet 56 to an outlet 60 through a cylindrical cage grid 61 fixed to the spiral grid 44 for being rotated with the spiral grid 44 by the drive means 45. The gaps in the cage grid 61 are of dimensions less than the food articles 11 to prevent passage therethrough. A rectangular-like bottom opening 62 of the grid cage portion 61 permits the tube outlet 60 to extend from the grid cage 61.

The grid cage 61 further includes respective upper and lower disk-shaped support plates 63, 64. The upper plate 63 includes a bearing for permitting rotation of the tube 43. The lower plate 64 includes a sleeve 65 for mounting a spindle 66 affixed to the tube 43 to further accommodate such rotation of the tube 43 relative to the grid cage 61. The tube 43 is rotated on the sleeve 65 by cage grid edge or wire 67 which forms a portion of the cage opening 62 and which engages a side of the tube 43 to rotate the tube 43. Another cage grid edge or wire 68 opposes cage grid edge 68 to also form a portion of cage opening 62.

A damper 70 is connected to the tube 43 to control rotation of the tube 43 relative to the grid cage 61 and its rectangular opening 62. The damper 70 includes an articulating damper arm 71 which is connected to the inlet portion 56 of the tube 43. The damper 70 is mounted on the container 40. The damper 70 includes a microswitch 72 for being contacted by a damper arm portion 73 for turning off the feed mechanism 10 when the tube outlet 60 has been returned by the damper 70 to be adjacent grid edge portion 67. As well as turning off the feed mechanism 10, the microswitch 72 includes a clock mechanism to turn on the drive means 45 after a predetermined period of deep frying time to drive the grid 44 and tube 43. When the damper arm portion 73 disengages the microswitch 72, the microswitch 72 sends a signal to the feed mechanism 10 to turn on the feed mechanism 10.

The grid cage 61 and the spiral grid 44 are driven by the drive means 45 for turning the spiral grid 44 and grid cage 61 in a first direction or forward stroke indicated by reference arrow A. The spiral grid 44 and grid cage 61 are driven in a second direction or backward stroke as indicated by reference arrow B by the quick release mechanism 46.

The drive means 45 includes a motor 75, a gear reducer 76, and a clutch 77. A drive shaft 78 extends from the drive means 45 through the floor of the container 40 via a sealed bearing 79 to be affixed to the lower plate 64 of the cage grid 61. The drive means 45 rotates the grid 44, cage grid 61, and the tube 43 for the forward stroke in the direction of arrow A.

The quick release mechanism or return means 46 for quickly turning the spiral grid 44 and cage grid portion 61 for the backward stroke in the second direction B includes a coil spring 81, one end of which is affixed to a nut and bolt tension adjustment means 82 for adjusting the tension of the spring 81. The other end of the coil spring 81 is affixed to a line 83, which in turn is secured to an arm 84 which is rigidly affixed to the upper plate 63 of the grid cage 61. The line 83 extends from the arm 84 to the coil spring 81 via a pulley 85 affixed to the container 40.

The return means 46 further includes a stop 86 on the upper plate 63 for engaging and triggering a limit switch 87 which, when engaged, deactivates the clutch 77 to disengage the shaft 78 from the motor 75 to permit the spiral grid 44 and grid cage 61 to turn in the second or backward direction B. In other words, when the stop 86 contacts the switch 87, the motor 75 and clutch 77 are turned off; at this moment, the return means 46 then snaps the spiral grid 44 back. The damper mechanism 70 is then permitted to pull or draw the tube end 60 from cage grid edge 68 to cage grid edge 67.

The return means 46 still further includes a stop 88 on the upper plate 63 for engaging an edge 89 of the ring tube and funnel support plate 57 for stopping the turning of the spiral grid 44 in the second or backward direction B. The limit switch 87 is mounted on the plate 57 along with an fluid level control sensor 90 and a fluid temperature control sensor 91.

The container 40 includes an upper fluid retaining rim 95 and a lower annular fluid output edge 96. The rim 95 and output edge 96 form a channel 97 into which fluid from the container 40 flows. From the channel 97, fluid flows to an fluid outlet port 98 and into an fluid outlet hose 99. Subsequently, the fluid may be filtered, heated, cooled, or otherwise treated before being directed into the fluid inlet hose 51. It should be noted that the container 40 may be heated directly such as a conventional deep fryer is heated.

The spiral grid 44 includes a vertical, lower most, retainer grid portion 110 to retain food articles 11 exiting from the tube outlet 60. The retainer grid portion 110 extends from the grid cage 61 to adjacent the inner wall of the container, and from approximately the floor of the container 40 to a first grid step 111A of the spiral grid 44. The grid portion 110 may remove food articles 11 which have stuck to the floor of the container 40.

The first grid step 111A is the first of a plurality of staggered grid steps 111 for transporting the food articles 11 step by step back to the surface 42 of the fluid 41. For example, a second step 111B is disposed at a slightly higher elevation than the first step 111A. A vertical grid portion 112A is disposed between first and second steps 111A, 111B and such vertical grid portions 112 are disposed between each of the remaining adjacent steps 111. The spiral grid 44 terminates with an uppermost vertical grid portion, or pusher 112B, which is partially submerged and partially above the fluid surface 42. Immediately prior to the grid portion 112B is a last step 111C which lies under the surface 42. Each of the grid steps 111 extends from the grid cage 61 to adjacent the inner wall of the container 40 so that the food articles 11 are retained against freely floating to the surface 42 of the fluid 41. It should be noted that the grid steps 111 and vertical grid portions 112 may be referred to as conveyers or conveyer means as these conveyers transport food articles 11 in the direction of arrow A.

The food articles 11 are transported back to the surface 42 step by step by first a relatively slow forward rotation of the spiral grid 44 and cage grid 61 in the direction indicated by arrow A. This rotation slowly turns the food articles in such a direction until the stop 86 contacts the switch 87, whereupon a relatively quick return or backward rotation of the spiral grid 44 and cage grid 61 is initiated by the return means 46 when the clutch 77 is deactivated. The return means 46 snaps the spiral grid 44 and cage grid 61 back in the direction of arrow B such that the food articles 11 are disengaged through the force of inertia from their respective steps 111 to float or floatably rise vertically and at least partially in the fluid 41 until engaged from above by the respective subsequent step 111. Such forward and backward strokes are repeated to eventually transport the articles 11 back to the surface 42.

An output grid 47 is fixed to rim 95 of the container 40 for transporting the food articles 11 out of the fluid 41. The output grid 47 includes a floor grid portion 121 with a submerged floor end portion 122. The output grid 47 further includes an inner retaining wall grid portion 123 and an outer retaining wall grid portion 124. The outer wall portion 124 includes a partially submerged portion 125 which extends beyond the submerged floor end portion 122 from the output grid 47. The final vertical grid portion 112B is rotated inwardly of the output portion 125, and may be rotated almost to the floor end portion 122.

The food articles 11 fall off the rim 95 to a storage receptacle such as a bucket. The output grid 47 may include a microswitch or sensor to sense passage of food articles 11 thereover. Such a microswitch may turn off the drive means 45, feed mechanism 10, and system power when no food articles 11 are sensed over a predefined period of time. Such a microswitch provides no interruption during initial start-up operations.

It should be noted that the output grid 47 is hingedly fixed to the rim 95 for flipping upwardly such that the floor end portion 122 is disposed at a height greater than the rim 95. This flipping is initiated at the end of the deep fry process to transport any remaining food articles 11 from the container 40. This flipping is accomplished with an actuator 130 which is responsive to power being turned off. The actuator 130 includes an arm 131 extending to the output grid 47 to effectuate such flipping.

In operation, after the food articles 11 are fed into the funnel 55 such as by the feed mechanism 10, the food articles 11 are swept via the stream of fluid flowing from the ring tube 53 through the tube 43. The initial higher density of food articles 11 and the velocity of their fall from the feed mechanism are also factors that contribute to the conveyance of the food articles 11 through the tube 43. As the food articles 11 are conveyed through the tube 43, their batter covering begins to expand and harden to form a relatively hard, shell-like covering having a lesser density. When released from the tube outlet 60, the food articles 11 rise to be engaged from above by the first grid step 111A, by which time or shortly thereafter the food articles 11 have a relatively harder shell to minimize being stuck to the first several grid steps 111. It should be noted that to eliminate such sticking the entire spiral grid 44, or at least the first several steps 111 and retainer grid portion 110, may be coated with plastic such as Teflon ®. The floor of the container 40 may also be coated with Teflon ®.

The beginning of a cycle may be defined by when the spiral grid 44 snaps back by operation of the return means 46. Here the outlet 60 of tube 43 is positioned adjacent grid portion 68, and wherefrom the tube 43 is returned relatively slowly via the damper 70 to become positioned adjacent grid portion 67. As the tube 43 is slowly returned, food pieces 11 are distributed under the cleared first several steps 111. Again, because of the variable pumping or resistance mechanism 52, some food articles 11 are engaged closer to the grid cage 61, some food articles 11 are engaged closer to the inner wall of the container 40, some food articles 11 are engaged closer to the vertical grid portion 112 of the highest cleared step, some are engaged closer to the retaining grid portion 110, and some are engaged therebetween. Subsequently, the tube outlet 60 becomes disposed adjacent the grid portion 67 and the feed mechanism 10 is turned off by the microswitch 72 which is triggered by contact with the returned arm 73. Thereafter, as regulated by the clock mechanism of microswitch 72 which may extend the processing or frying time if desired, the motor 45 is turned on and the clutch 77 is engaged to drive the spiral grid 44, grid cage 61, and tube 43 in the forward direction of arrow A, which drives the damper arm portion 73 away from the microswitch 72 to turn on the feed mechanism 10.

As the grid cage 61 is being so rotated in the direction of arrow A over a distance defined by one, two, three or more steps, its edge portion 67 engages and rotates the tube 43. When the stop 86 contacts the limit switch 87, the clutch 77 is deactivated and the motor 75 is turned off to permit the tensioned return means 46 to relatively quickly snap the spiral grid 44 back to its original position whereupon, to measure and stop such a return, the stop 88 engages the abutment plate edge 89.

As the spiral grid 44 snaps back in the direction of arrow B, the steps 111 disengage from their respective food pieces 11. In other words, the food pieces 11 remain undisturbed under the force of inertia until disengaged, whereupon under the force of gravity, the food pieces 11 floatably rise or float to be engaged by the respective subsequent step. Accordingly, the first several steps 111 are cleared for receiving food pieces 11 from the tube 43, whose outlet 60 is again adjacent to edge portion 68.

As the food articles 11 rise step by step under the spiral grid 44, the food articles 11 are deep fried. The amount of time for such deep frying may be controlled by the number of steps, the temperature of the fluid 41, the type of food article 11, the size of the food article or type of fluid 41 such as oil or water, the microswitch 72 which may regulate the frequency at which the drive means 45 is turned on and off, the circulation of the fluid 41, or the freshness of the fluid 41, or other factors such as the length of the arc of the stroke which may be defined by the distance between the stop 86 and the limit switch 87.

After being disengaged from the last step 111C, the food articles 11 float to the surface 42. Subsequently, the floating food articles 11 are pushed via the vertical grid portion 112B toward the output grid 47. Such food articles 11 are then pushed by subsequently floating food articles 11 onto the floor grid portion 121. Such a push action continues as even more food articles 11 float to the surface 42 and are pushed by vertical grid portion 12B. Accordingly, food articles 11 are pushed up the output grid 47 and out of the container 40. At the end of the deep fry process, the output grid 47 is flipped as previously described to transport the last food articles 11 out of the container 40.

It should be noted that the width of the opening 62 may extend one or two or three steps or more. Hence, food articles 11 may initially be distributed over more than one or two steps 111.

It should be noted that, while preferred, the steps 11 and the vertical grid portions 112 are not required. The spiral grid 44 may in fact be a "true" spiral or helical grid which continually rises without steps toward the surface 42.

Figure 3:
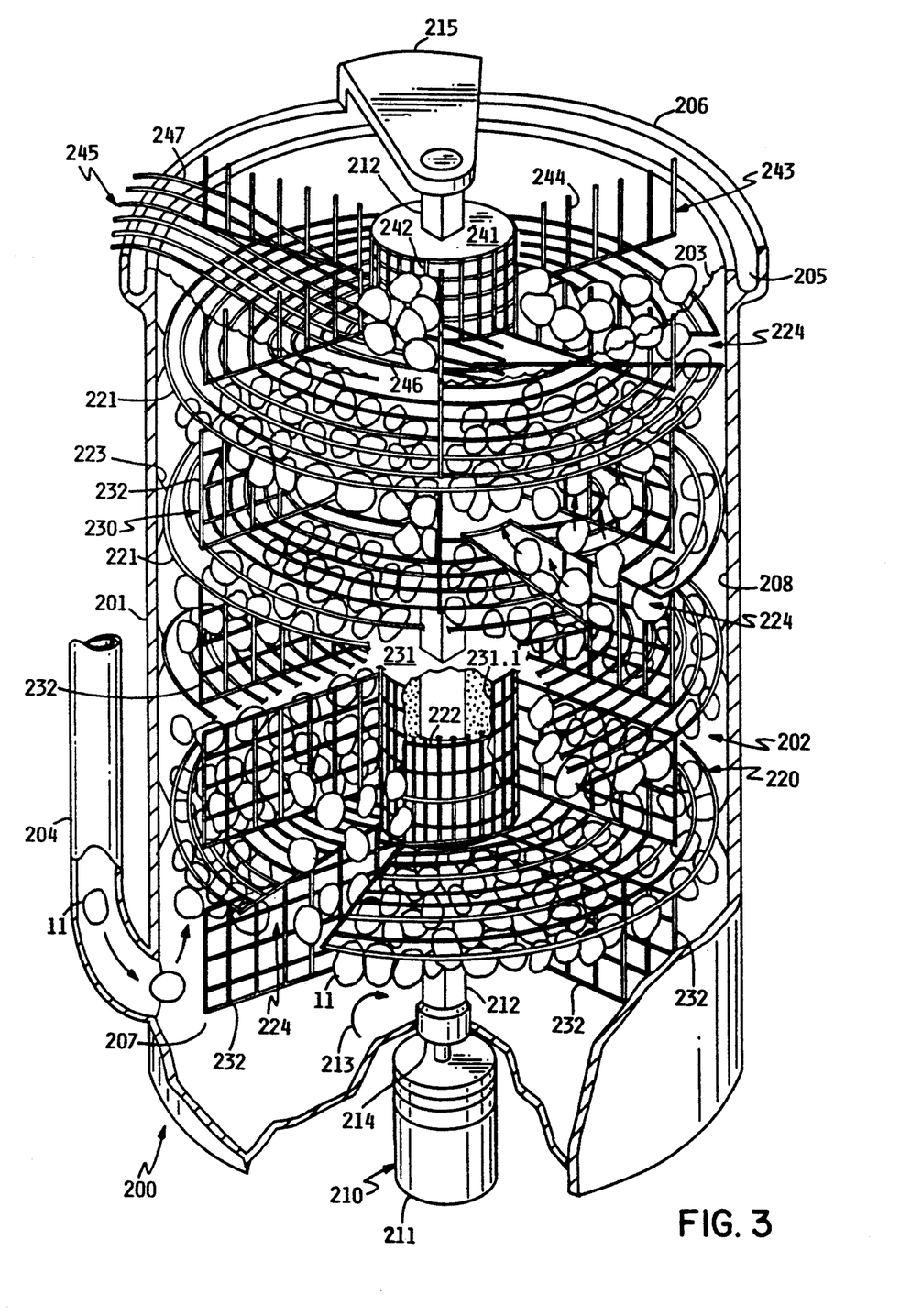
FIG. 3 is a perspective, partially broken away, and partially schematic view of an alternate process apparatus.

As shown in FIG. 3, in an alternate embodiment of the invention, a deep fryer mechanism or processing apparatus 200 includes a fluid container 201 for holding fluid 202 such as cooking oil. The fluid 202 has a surface 203. The fluid 202 enters the container 201 via an inlet tube 204 for conveying the food articles 11 into the container 201. The fluid 202 exits the container 201 via an output channel 205 adjacent a rim 206 of the container 201. The container 201 further includes a floor 207 and an inner wall 208. It should be noted that the inlet tube 204 may be oblong in cross-section.

A drive means 210 for the deep fryer 200 includes a motor 211, a square tubular shaft 212 for being continually driven in a clockwise direction as indicated by arrow 213, a lower bearing 214 for engaging the shaft 212 relative to the floor 207, and an upper bearing support plate 215 removable from rim 206 for removably fixing the shaft 212 relative to the rim 206. The support plate 215 is also removable from the shaft 212.

A food article engagement means 220 includes a set of several annular grid portions or levels or staggered steps 221 such as four steps 221 which are fixed to cylindrical cage grid portions 222. The steps 221 along with their respective cage grid portions 222 are removably fixed for cleaning purposes to the inner wall 208 via indented flat springs 223. Each of the steps 221 includes a generally trapezoidal opening 224 for permitting the food articles 11 to rise or float from step to step or to the surface 203. Each of the openings 224 of the upper three steps 221 is staggered relative to its immediately lower step 221 such that food articles 11 rising through the openings 224 are immediately engaged by the next higher step 221. The distance of the arc between the openings 224 of the adjacent steps 221 is typically over 270° but less than 360° such that a set of six conveyer means 230 convey the food articles 11 a maximum distance between the openings 224.

Each of the conveyer means 230 includes a disk-like support plate 231 with a cage portion 231.1 connected to a set of six grid rectangular conveyers or push mechanisms 232 for conveying the food articles 11 to the openings 224. Each of the support plates 231 and their respective cage portions 231.1 is slidably and removably engaged to the square tubular shaft 212. Each of the cage portions 231.1 affixed to the support plates 231 is slightly greater in diameter than the cage grid portions 222 to somewhat overlap the cage grid portions 222. The grid conveyers 232 extend from the cage portions 231.1 of support plates 231 to the inner wall 208 and are spaced from each other at 60° angles. Of course, the number of grid conveyers 232 may vary from one to more than six.

An uppermost output conveyor mechanism 240 includes a support plate 241 slidably and removably engaged to the shaft 212, a cage grid portion 242 affixed to the support plate 241, and an output fork or rake-like or harrow-like conveyor 243 having upright arms 244 for passing between and through an output grid 245. Neither the output conveyor 243 nor the output grid 245 includes wires which cross each other as the output conveyor 243 continually rotates in the direction of arrow 213. It should be noted that the output grid 245 includes a circular portion 246 which is at least partially submerged under the surface 203. The circular portion 246 leads into a more linear portion 247 for directing the food articles 11 out of the container 201. The linear portion 247 is disposed at a greater elevation than the upper ends of the arms 244.

In operation, the food articles 11 are swept down the inlet tube 204 such as by a stream of fluid and, upon exiting the tube 204, floatably rise to be engaged by the first step or level 221. Subsequently, the food articles 11 are conveyed by the conveyer 232 for more than 270° to the opening 224 of the first step or level 221. Upon reaching the first opening 224, the food articles 11 floatably rise to the next higher step or level 221. Such conveying and floating steps of the method continue until the food articles 11 float to the surface through the opening 224 of the last step 221. The food articles 11 are then conveyed by the output conveyer 243 to the output grid 245 to be directed out of the container 201.

Figure 4:
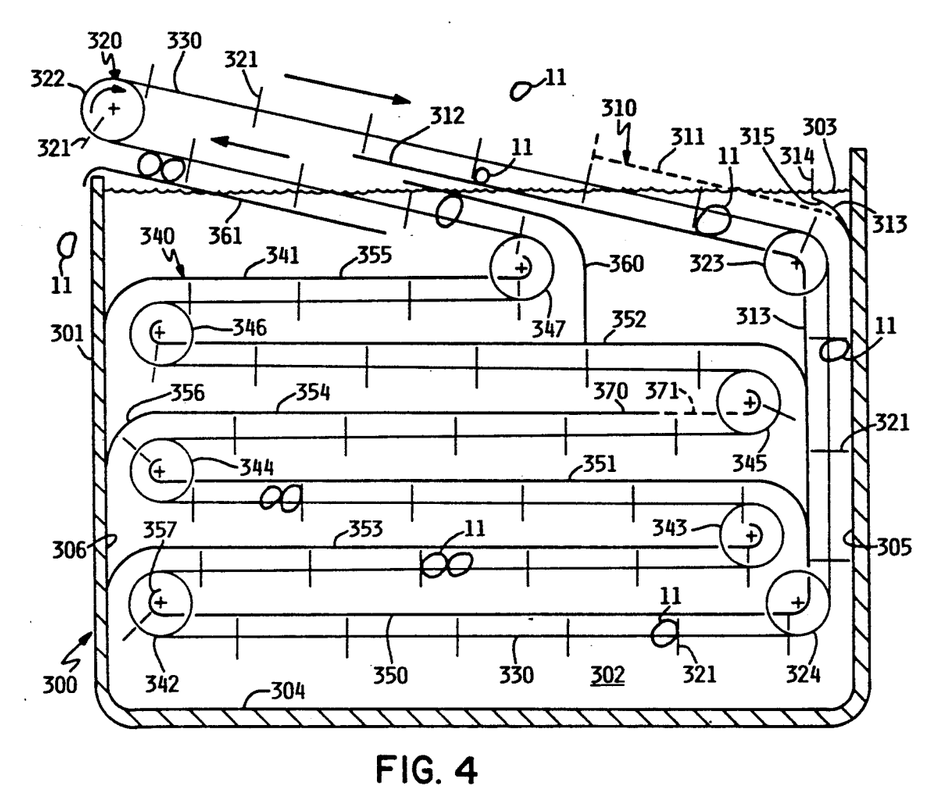
FIG. 4 is a schematic view of an alternate process apparatus for treating floatable articles.

As shown in FIG. 4, in another alternate embodiment of the invention, a deep fryer or processing apparatus 300 includes a fluid container 301 for fluid 302 such as cooking oil having a surface 303. The container 301 includes a floor 304 and a pair of inner walls 305, 306.

A food article submerging means 310 includes upper and lower obliquely extending grids 311, 312. The lower grid 312 is at least partially submerged under the surface 303 and lies partially above the surface 303 to catch food articles 11 falling from a feed mechanism such as feed mechanism 10, or feed mechanism 700 described below. The lower grid 312 leads into a vertically extending grid 313. The upper grid 311 is removably attached to the inner wall 305 of the container 301 for food articles that are immediately floatable. Such food articles may be precooked food pieces that have been fried and frozen to be deep fried again. When grid 311 is not utilized, a retaining curved grid 313 is utilized for food articles which at least initially sink, such as batter-dipped food pieces. Wet, batter-dipped food articles 11 may smear if dropped onto an upper portion of the longer input grid 312. The retaining grid 313 includes a vertical portion 314 and short pin 315 for detaching food articles 11 which may impinge themselves upon the conveyors 321.

The food article submerging means 310 further includes a belt and pulley mechanism 320 for linearly driving grid conveyers 321. The belt and pulley mechanism 320 of the submerging means 310 includes a pair of drive pulleys 322, a pair of passive pulleys 323 and a pair of passive pulleys 324. Pulleys 322, 323, 324 are supported via shafts engaging grid side portions which extend between walls 305, 306.

Figure 5:
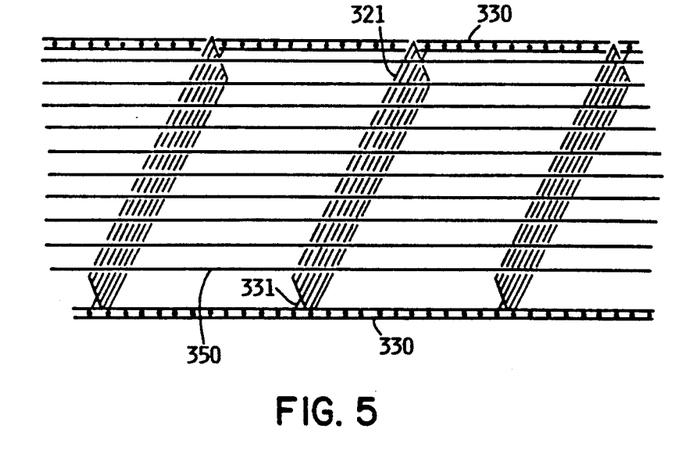
FIG. 5 is a schematic view of grid conveyors, belts, and a grid step of the apparatus of FIG. 4.

As shown in FIG. 5, the belt and pulley mechanism 320 includes a pair of belts 330 for engaging the respective pairs of pulleys 322, 323, and 324, with the grid conveyers 321 extending between the belts 330. The height of the grid conveyers 321 is slightly less than the distance between the upper and lower grids 311, 312, and the distance between the vertical grid 313 and inner wall 305 to minimize escape of floatable food articles 11 from the grid conveyors 321. The grid conveyors 321 are preferably rigidly fixed to the belts 320 via pins 331.

A food article engagement means 340 includes the belt and pulley mechanism 320 and further includes a set of staggered grid steps 341 for retaining the food articles 11 fully submerged in the fluid and for transporting the submerged food articles 11 back to the surface 303. The grid steps 341 are fixed relative to the walls of the container 301 and are staggered relative to their immediately adjacent steps 340. The steps 341 engage the food articles 11 from above while the food articles 11 wind their way through the steps 341 and back to adjacent drive pulley 322.

The passive pulleys of the engagement means 340 include pulleys 324, 342-347. Retaining and staggered grids of the engagement means 340 include grids 350, 351, 352 fixed to the vertical grid 313, and grids 353, 354, 355 fixed to the inner wall 306. Grids 351-355 have proximal end portions 356 which curve upwardly to provide for a smooth, nontrapping conveyance of the food articles 11. Grids 350-355 have smoothed curved distal end portions 357 to also guide the food articles 11. Shafts for the pulleys may extend adjacent end portions 357.

A first output grid 360 extends upwardly from grid 352 and curves about pulley 347. A second output grid 361 fixed to the container 301 is partially submerged under the surface 303 and extends partially above the surface 303 to direct the food articles 11 out of the container 301.

In operation, after being submerged by the submerging means 310, the food articles 11 are conveyed by the linearly driven conveyors 321 underneath the grids 350-360. As the food articles 11 are conveyed to the staggered end portions or staggered openings of the grids 350-360, the food articles 11 float or rise to the immediately higher grid 351-360 to be engaged from above by such grid. Subsequently, the output grid 361 and the conveyors 321 cooperate to direct the food articles 11 out of the container 301.

It should be noted that the grids or steps 350-355 may terminate before their end portions 357 such that the food pieces 11 floatably rise prior to reversal of the direction of the conveyors 321 by the pulleys 342-347. This shorter grid or step is indicated by reference numeral 370. The portion of step 354 which is deleted is indicated by the dashed lines referenced by number 371.

Figure 6:
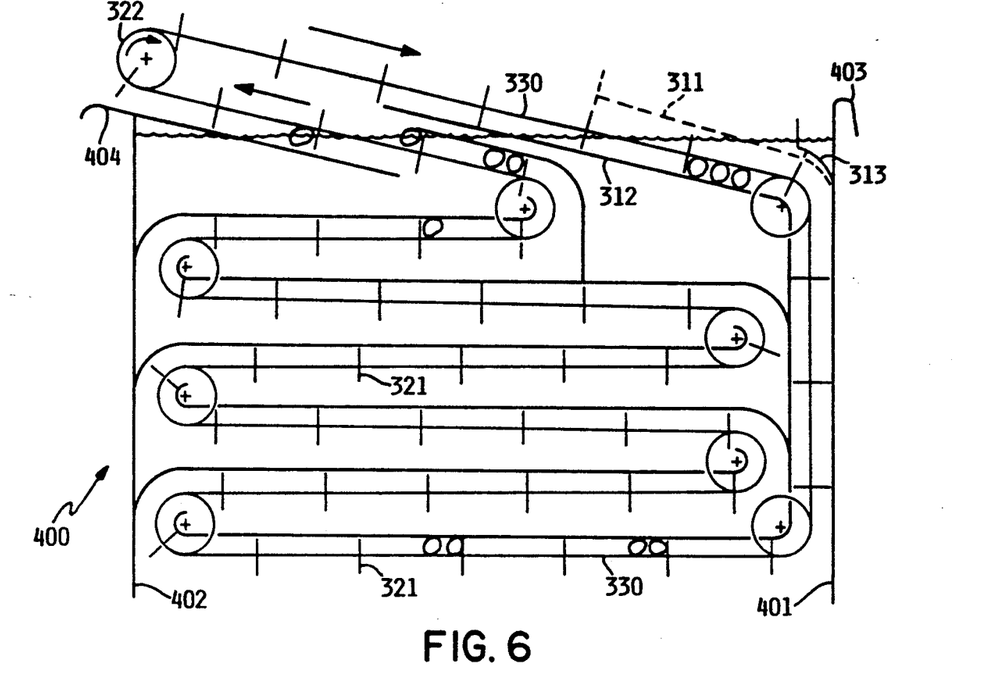
FIG. 6 is a schematic view of an alternate process apparatus for being removably disposed in a container for treating floatable articles.

As shown in FIG. 6, in an alternate embodiment of the invention, a deep fryer mechanism or processing apparatus 400 is similar to the deep fryer mechanism 300 except that the deep fryer mechanism 400 includes wall grids 401, 402 which replace the walls 305, 306 of the deep fryer 300. Accordingly, the deep fryer mechanism 400 is removable from a wok or container such as container 301. Each of the grid walls 401, 402 includes respective hook portions 403, 404 for engaging the upper edges of a container for supporting the deep fryer mechanism 400 therein. It should be noted that the pulleys of the deep fryer mechanism 400 ride on shafts extending from grid walls or portions transversing the walls 401, 402.

Figure 7:
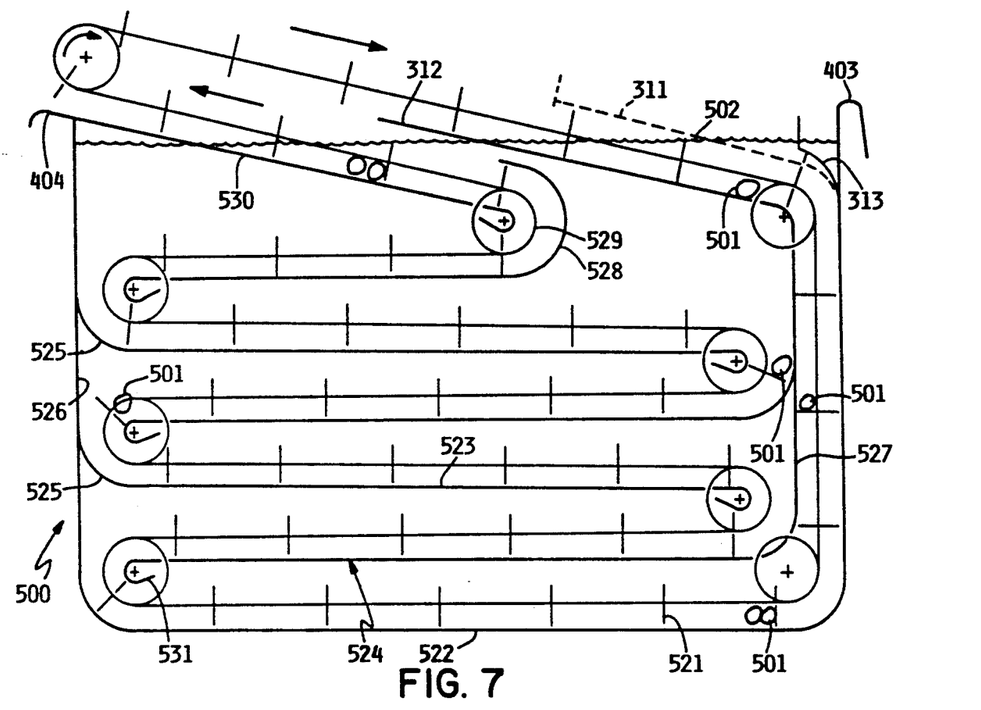
FIG. 7 is a schematic view of an alternate process apparatus for treating sinkable articles.
Figure 8:
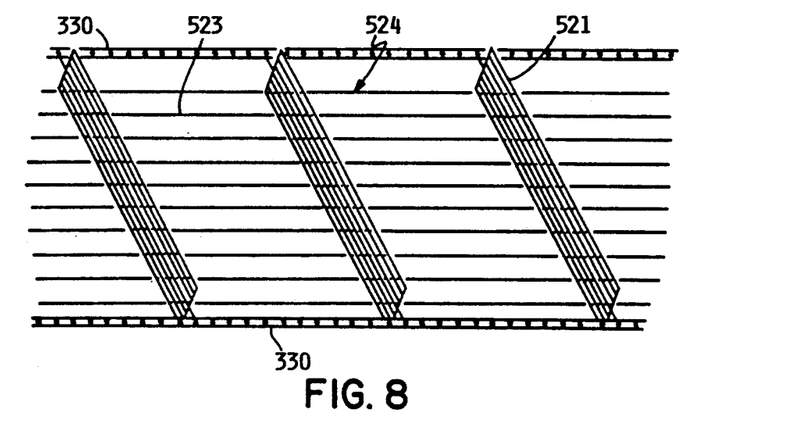
FIG. 8 is a schematic view of grid conveyors, belts, and a grid step of the apparatus of FIG. 7.

As shown in FIGS. 7 and 8, in an alternate embodiment of the invention, a deep fryer mechanism or processing apparatus 500 is utilized for food articles 501 which have a greater density than the fluid 502. The deep fryer 500 is similar to the deep fryer 400 except that the grid conveyers 521 are disposed adjacent to a grid floor 522 and adjacent to floors 523 of each of the staggered steps 524. Furthermore, distal end portions 525 of the floors 523 curve upwardly from their respective floors 523 to either an inner grid wall 526 or a grid 527 which forms a portion of the submerging means. Still further, an output grid 528 is curved about the last sequential pulley 529 to direct the relatively heavy food articles 501 onto the output grid 530 which extends from pulley 529, Even further, proximal end portions 531 of the steps 524 are somewhat pinched to guard against catching or trapping food articles 11 or conveyers 521.

Figure 9:
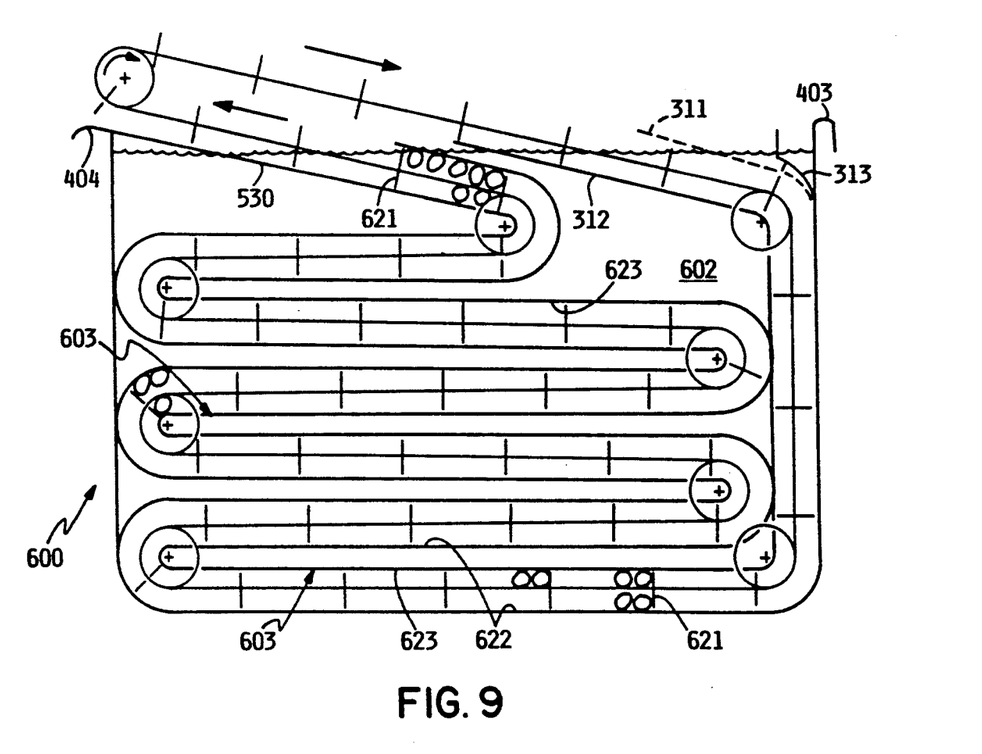
FIG. 9 is a schematic view of an alternate process apparatus for treating both floatable and sinkable articles.

As shown in FIG. 9, a deep fryer mechanism or processing apparatus 600 is utilized for food articles having densities lesser than, equal to, or greater than the density of the fluid 602. The deep fryer mechanism 600 includes features similar to features of each of the deep fryer mechanisms 400, 500 except that the distance between adjacent staggered grid steps 603 is only slightly greater than the height of the conveyers 621 so that the conveyers 621 are disposed adjacent to both the grid floors 622 and grid ceilings 623 of the steps 603. Accordingly, both relatively light and relatively heavy articles are continuously conveyed from the input grid 312 to the output grid 530.

An alternate feed mechanism 700 is shown in FIG. 10. The feed mechanism 700 is similar to the feed mechanism 10 except that a number of belt and pulley mechanisms 25 are fixed in a spaced apart relationship by upper and lower shafts 701, 702. This feed mechanism 700 is utilized with the deep fryer mechanisms 300, 400, 500, and 600 which are somewhat elongate in width as shown by the conveyers 321, 521 in FIGS. 5 and 8. This feed mechanism 700 may also be utilized with the deep fryer mechanism 200 when the inlet tube 204 is oblong.

Another alternate feed mechanism 750 is shown in FIG. 10A and is similar to feed mechanisms 10 and 700 except that a pulley support plate 751 is angular to support a set of three passive pulleys 752, 753, and 754. Pulley 754 may be supported relative plate 751 via U-shafts. Pulley 754 may also be relatively thin to engage only a portion of the outer face of the belt to permit the pin of the belt to slip by the face of the pulley. The pins may be formed on the side of the belt for this pulley and belt mechanism. This angular pulley and belt arrangement decreases the distance the food articles 11 fall to the inlets of the deep fryer apparatus.

FIGS. 11-14 show a vending machine apparatus 800 for utilizing one or more of the deep fryer mechanisms 12, 200, 300, 400, 500, 600. The vending machine apparatus 800 includes a housing 801, a fresh oil tank 802, a used oil tank 803, a refrigeration apparatus 804, an input and control system 805, and an exhaust hood 806.

Figure 11:
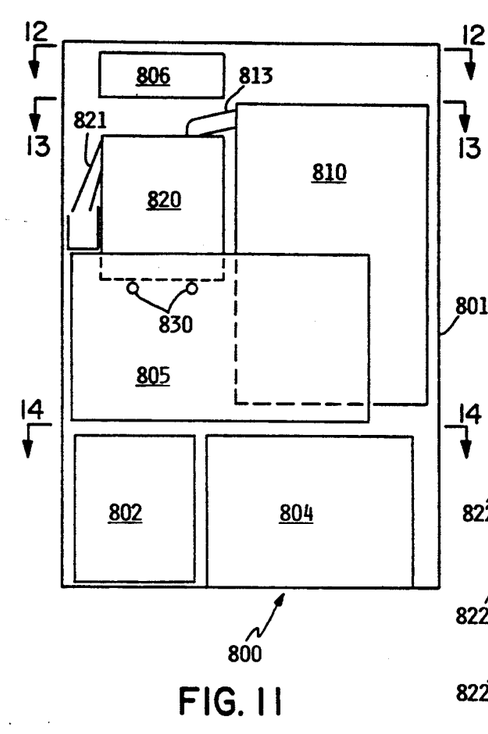
FIG. 11 is a schematic view of a vending machine for utilizing the process apparatus of FIGS. 4, 6, 7, 9, and 10.
Figure 12:
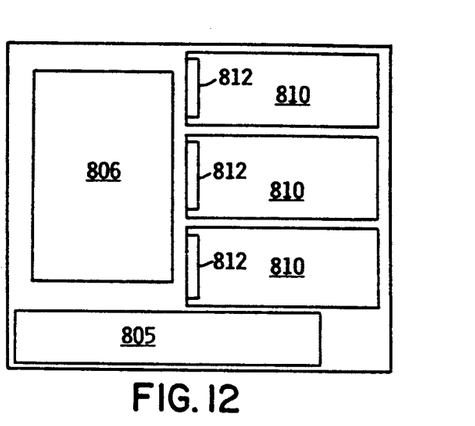
FIG. 12 is a schematic view at generally lines 12—12 of FIG. 11.
Figure 13:
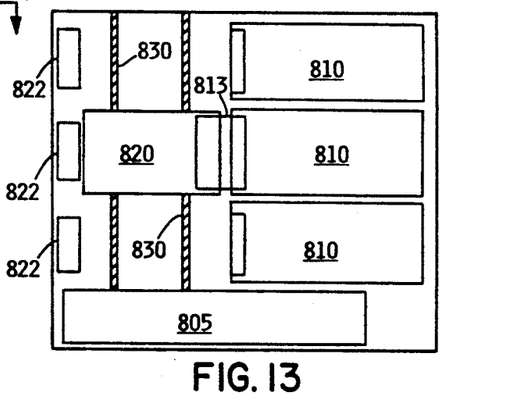
FIG. 13 is a schematic view at generally lines 13—13 of FIG. 11.
Figure 14:
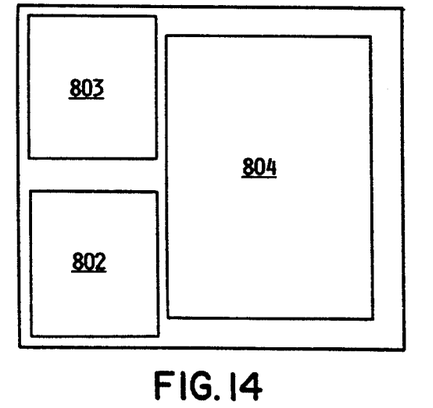
FIG. 14 is a schematic view at generally lines 14—14 of FIG. 11.

The vending machine 800 further includes a set of processing apparatus or cold storage means 810 having insulated walls for cold storage of, for example, food articles. Each of the cold storage means 810 includes one of the apparatus 500, as shown in FIG. 7, for storing and delivering articles from an output 812, to a feeder 813, and subsequently to a deep fryer 820, which preferably includes the apparatus shown in FIG. 9 and indicated by the reference numeral 600. The deep fryer 820 includes an output or feed 821 for depositing food articles into outlets 822. The deep fryer 820 rides on a set of tracks 830 for orienting the output 821 relative to the outlets 822.

In operation, the cold storage means 810 is maintained without a fluid at a relatively cold temperature by the refrigeration apparatus 804. One of the storage means 810 may store sweet and sour chicken entrees, another storage means 810 may store sweet and sour pork, and the remaining cold storage means may store egg rolls.

When an entree is selected, such as by the deposit of coins in and the depression of buttons on the input and control system 805, the deep fryer 820 is driven to one or more of the selected cold storage means 810. The entrees are conveyed sequentially into the deep fryer 820 via the feeder 813, then deep fried in the deep fryer 820, and subsequently delivered into one or more outlets 822 by the deep fryer 820 being driven on the tracks 830 by the input and control system 805.

Prior to, during, or after such deep frying in deep fryer 820, fresh fluid or oil may be delivered from the fresh oil tank 802 to the deep fryer 820. Used oil may be delivered from the deep fryer 820 to the used oil tank 803. An exhaust hood 806 maintains the environment in the housing 801 at a negative pressure except, of course, the apparatus 810. The input and control system 805 operates the tanks 802, 803, refrigeration apparatus 804, exhaust hood 806, cold storage means 810, and deep fryer 820 with respect to each other.

It should be noted that the food articles 11 may be dropped by hand into any of the deep fryer mechanisms 12, 200, 300, 400, 500, or 600. It should be further noted that all the grid portions of such deep fryer mechanisms may be coated with a material such as Teflon ® to eliminate sticking of food articles 11 to such grid portions and to facilitate cleaning thereof.

It should further be noted that the grid conveyers 321 may include resilient separator grid portions disposed perpendicularly of the conveyers 321 to portion off the food articles 11 from each other.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A deep fry apparatus for deep frying food articles below the surface of a fluid, comprising:
   a) a container for the fluid;
   b) submerging means for submerging the articles below the surface of the fluid; and
   c) engagement means comprises of a set of steps in the container for engaging and retaining under the surface the articles submerged in the fluid and for transporting the articles retained under the fluid step by step and generally in sequence back to the surface of the fluid whereby the articles are deep fried under the surface of the fluid.

2. A deep fry apparatus for deep frying food articles below the surface of a fluid, comprising:
   a) a container for the fluid;
   engagement means in the container for engaging and retaining under the surface the articles submerged in the fluid and for transporting the articles retained under the fluid back to the surface of the fluid whereby the articles are deep fried under the surface of the fluid; and
   c) quick release means for rapidly and periodically disengaging the articles from the engagement means each that the articles are transported by increments in one direction.

3. The apparatus of claim 1 and the articles being floatable on the fluid, wherein the engagement means engages the articles from above the articles.

4. The apparatus of claim 1 and the articles being sinkable in the fluid, wherein the engagement means engages the articles from underneath the articles.

5. The apparatus of claim 1 further comprising a transport means for moving the articles along the engagement means.

6. The apparatus of claim 1, wherein the engagement means further comprises a grid.

7. The apparatus of claim 2, wherein the engagement means further comprises a reverse quick release means for alternately conveying the food articles in reverse direction periodically.

8. The apparatus of claim 2, wherein the engagement means comprises a spiral form.

9. The apparatus of claim 2 and the articles being floatable on the fluid, wherein the engagement means comprises:
   a) a spiral grid for engaging the articles submerged in the fluid from above the articles and for transporting the articles submerged in the fluid to the surface of the fluid; and
   b) quick release means for rapidly and periodically disengaging the articles from portions of the engagement means relative to other portions of the engagement means whereby the articles rise by increments back to the surface of the fluid.

10. The apparatus of claim 9, wherein the spiral grid comprises a set of steps for transporting the articles step by step back to the surface of the fluid.

11. The apparatus of claim 2 or 1, comprises a tube with a stream of fluid being conveyed therethrough, the tube having an inlet for receiving the articles and an outlet for releasing the articles under the surface of the fluid, the outlet being disposed under the surface of the fluid.

12. The apparatus of claim 11, further comprises variable means for varying the velocity of the stream of fluid through the tube whereby articles are engaged at various locations relative to the engagement means.

13. The apparatus of claim 11, wherein the tube is turnable relative to the engagement means whereby the articles are engagable at various locations on the engagement means.

14. The apparatus of claim 2 further comprising output means for moving the articles after deep frying out of the fluid and out of the container.

15. The apparatus of claim 14, wherein the output means comprising a grid extending above and below the surface of the fluid such that a portion of the engagement means pushes articles onto the output grid and out of the container when the engagement means is rotated.

16. The apparatus of claim 15, wherein the grid of the output means is liftable out of the surface of the fluid whereby articles on the grid slide out of the container.

17. The apparatus of claim 1, wherein the engagement means comprises:
   a) a set of grids for engaging the articles; and
   b) transport means for transporting the articles relative to the grids, each of the grids having a staggered opening for permitting the articles to floatably rise or sink therethrough, whereby the articles are transportable by the transport means between the openings.

18. The apparatus of claim 17 wherein each of the grids comprises a disk shape and each of the transport means rotates on an axis perpendicular to the surface of the fluid.

19. The apparatus of claim 17, wherein the transport means is driven linearly.

20. The apparatus of claim 18, wherein the transport means further comprises an output means for transporting the articles out of the surface of the fluid and out of the container, the output means comprising a fork and an output grid extending above and below the surface of the fluid, the fork being turnable continuously in one direction about an axis and through at least a portion of the output grid.

21. The apparatus of claim 1, wherein the engagement means comprises a set of levels at different heights relative to each other and a set of transport means for conveying the articles from level to level whereby the articles are transported level by level back to the surface of the fluid.

22. The apparatus of claim 1 further comprising output means for moving the articles after deep frying out of the fluid and out of the container.

23. The apparatus of claim 22 wherein the output means comprising a belt and pulley mechanism.

24. The apparatus of claim 22, further comprising an output grid for transporting the articles from the container, a portion of the output grid submerged below the surface, and another portion of the output grid being above the surface.

25. The apparatus of claim 1 and the articles being floatable on the fluid, wherein the engagement means alternately conveys the articles at a substantial angle to the vertical and alternately permits the articles to floatably rise at least partially toward the surface whereby the articles are transported by increments back to the surface of the fluid.

26. The apparatus of claim 1, wherein the submerging means comprises a belt and pulley mechanism for submerging the articles.

27. The apparatus of claim 1, wherein the engagement means comprises a belt and pulley mechanism for transporting the articles under the surface of the fluid and back to the surface of the fluid.

28. The apparatus of claim 27, wherein the submerging and engagement means are adapted for sequential storage and feeding.

29. The apparatus of claim 1, further comprising a feed mechanism for feeding the articles to the container, the feed mechanism comprising:
a) a receptacle for containing the articles to be processed;
b) an endless belt and pulley mechanism at least partially extending into the receptacle, the belt comprising pickup means for engaging and picking up the articles, the pickup means permitting the articles to disengage from the pickup means under the force of gravity to fall into the container.

30. The apparatus of claim 1, wherein the engagement means at least partially in the container comprising a belt and pulley mechanism with paddle grids supported by the belt for engaging and retaining under the surface the articles submerged in the fluid and for transporting the articles retained under the fluid back to the surface of the fluid whereby the articles are deep fried under the surface of the fluid.

31. The apparatus of claim 1, wherein the engagement means is arranged in a plurality of vertical levels.

32. The apparatus of claim 1, further comprising a single conveyor mechanism comprising the submerging means, transport means for moving the articles along the engagement means and output means for transporting the articles out of the fluid and out of the container.

33. The apparatus of claim 1, further comprising a single conveyor mechanism comprising the submerging means and transport means for moving the articles along the engagement means.

34. The apparatus of claim 1, further comprising a single conveyor mechanism comprising transport means for moving the articles along the engagement means and output means for transporting the articles out of the fluid and out of the container.

35. A deep fry apparatus for deep frying food articles below the surface of a fluid in combination with a vending machine, the combination comprising:
a) the vending machine, which comprises:
1) a housing including input means for receiving information and an outlet through which articles are dispensed;
2) storage means for storing the articles to be deep fried in the deep fryer apparatus;
3) feed means for feeding the articles from the storage means to the deep fryer apparatus, and from the deep fryer apparatus to the outlet;
4) control means for controlling the input means, storage means, feed means, deep fryer apparatus, and outlet relative to each other; and
b) the deep fry apparatus, which comprises:
1) a fluid container for the fluid;
2) submerging means for submerging the articles below the surface of the fluid; and
3) engagement means in the container for engaging the articles submerged in the fluid and for transporting the articles submerged in the fluid back to the surface of the fluid whereby the articles are deep fried under the surface of the fluid.

36. An automatic deep fryer apparatus for deep frying food articles below the surface of a hot fluid, the food articles being generally floatable on the fluid, comprising:
a) a container for the hot fluid;
b) a spiral grid rotatable in the container;
c) drive means for at least partially rotating the grid and conveying the food articles in one direction;
d) quick release means for relatively quickly rotating the grid in the other direction alternately of the drive means and for quickly releasing the food articles from a portion of the spiral grid;
e) fluid circulating means for circulating the fluid and comprising a tube disposed generally coaxially with the spiral grid, the tube comprising a tube inlet and a tube outlet, the tube inlet being at or above the surface of the fluid, the tube outlet being disposed below at least a section of the spiral grid, the fluid circulating means circulating fluid from the tube inlet to the tube outlet to convey food articles from the tube inlet to the tube outlet where the food articles are released to and are engaged from above by the spiral grid, the food articles subsequently being incrementally transported back to the surface of the fluid by alternate rotations of the spiral grid by the drive and quick release means; and
f) automatic output means adjacent to the container for automatically transporting the food articles out of the surface and out of the container.

37. An automatic deep fryer apparatus for deep frying food articles below the surface of a hot fluid, the food articles being generally floatable on the fluid, comprising:

a) a container for the hot fluid;
b) input means disposed at least partially at a lower portion of the container for submerging the food articles;
c) a set of generally disk-shaped grids disposed in the container at different levels, the input means releasing food articles below a lower disk-shaped grid, each of the disk-shaped grids having an opening to permit the food articles to floatably rise therethrough, each of the openings being staggered relative to the openings of adjacent disk-shaped grids;
d) a set of rotatable conveyors disposed between the disk-shaped grids for conveying the food articles to the openings in the disk-shaped grids where the food articles floatably rise therethrough to be engaged by another disk-shaped grid or to float to the surface whereby the food articles are transported level by level back to the surface the fluid; and
e) automatic output means adjacent to the container for automatically transporting the food articles out of the surface and out of the container.

38. An automatic deep fry apparatus for deep frying food articles below the surface of a hot fluid, comprising:

a) a container for the fluid;
b) a grid arrangement disposed in the container and including a set of steps, each of the steps disposed at a different level in the container, each of the steps being staggered relative to adjacent steps;
c) input means for submerging the articles to a lower step of the grid arrangement;
d) an endless belt and pulley mechanism disposed in the container and including a set of conveyors driven by the mechanism through the grid arrangement step by step for transporting the articles step by step through the grid arrangement and back to the surface of the fluid; and
e) automatic output means adjacent to the container for automatically transporting the food articles out of the surface and out of the container.

39. An automatic deep fry apparatus for deep frying food articles below the surface of a hot fluid, comprising:

a) a container for the fluid;
b) a grid arrangement disposed in the container and including a set of steps, each of the steps disposed at a different level in the container, each of the steps being staggered relative to adjacent steps;
c) input means adjacent the grid arrangement for submerging the articles to a lower step of the grid arrangement;
d) transport means adjacent the grid arrangement for transporting the articles step by step from the lower step back to the surface of the fluid; and
e) output means adjacent the grid arrangement for transporting the articles out of the surface of the fluid and out of the container.

40. A deep fry apparatus for deep frying food articles, comprising:

a) a surrounding wall with a top portion and an open bottom with a space within the wall between the top portion and the open bottom;
b) means for heating the space; and
c) engagement means comprised of a set of steps located within the space for engaging and for transporting the articles step by step and generally in sequence between the open bottom and the top portion whereby the articles are deep fried under the influence of the heating means.

41. The apparatus of claim 40, further comprising a feed mechanism for feeding the articles to the apparatus.

42. The apparatus of claim 40, further comprising an output means for moving the articles after frying out of the apparatus.

43. The apparatus of claim 40, further comprising quick release means for rapidly and periodically disengaging the articles from the engagement means such that the articles are transported by increments in one direction whereby the articles are deep fried.

44. The apparatus of claim 40 further comprising a transport means for carrying the articles along the engagement means.

45. The apparatus of claim 44, wherein the transport means comprising a single conveyor mechanism which is arranged in a plurality of vertical levels.

* * * * *

UNITED STATES PATENT AND TRADEMARK OFFICE
CERTIFICATE OF CORRECTION

PATENT NO. : 5,259,302

DATED : November 9, 1993

INVENTOR(S) : Cheng-Tsun Chen

It is certified that error appears in the above-identified patent and that said Letters Patent is hereby corrected as shown below:

In column 8, line 68, please delete the numeral "12B" and replace it with --112B--.

In column 9, line 9, please delete the numeral "11" and replace it with --111--.

In column 13, line 49, please delete "comprises" and replace it with --comprised--.

In column 13, line 59, please insert --b)-- before the word "engagement".

In column 13, line 67, please delete the word "each" and replace it with --such--.

Signed and Sealed this

Twelfth Day of April, 1994

Attest:

BRUCE LEHMAN

*Attesting Officer*    *Commissioner of Patents and Trademarks*